May 5, 1936. C. H. HOWLAND-SHEARMAN 2,039,848
ADJUSTABLE MICROMETER CRANK
Filed July 27, 1934 2 Sheets-Sheet 1
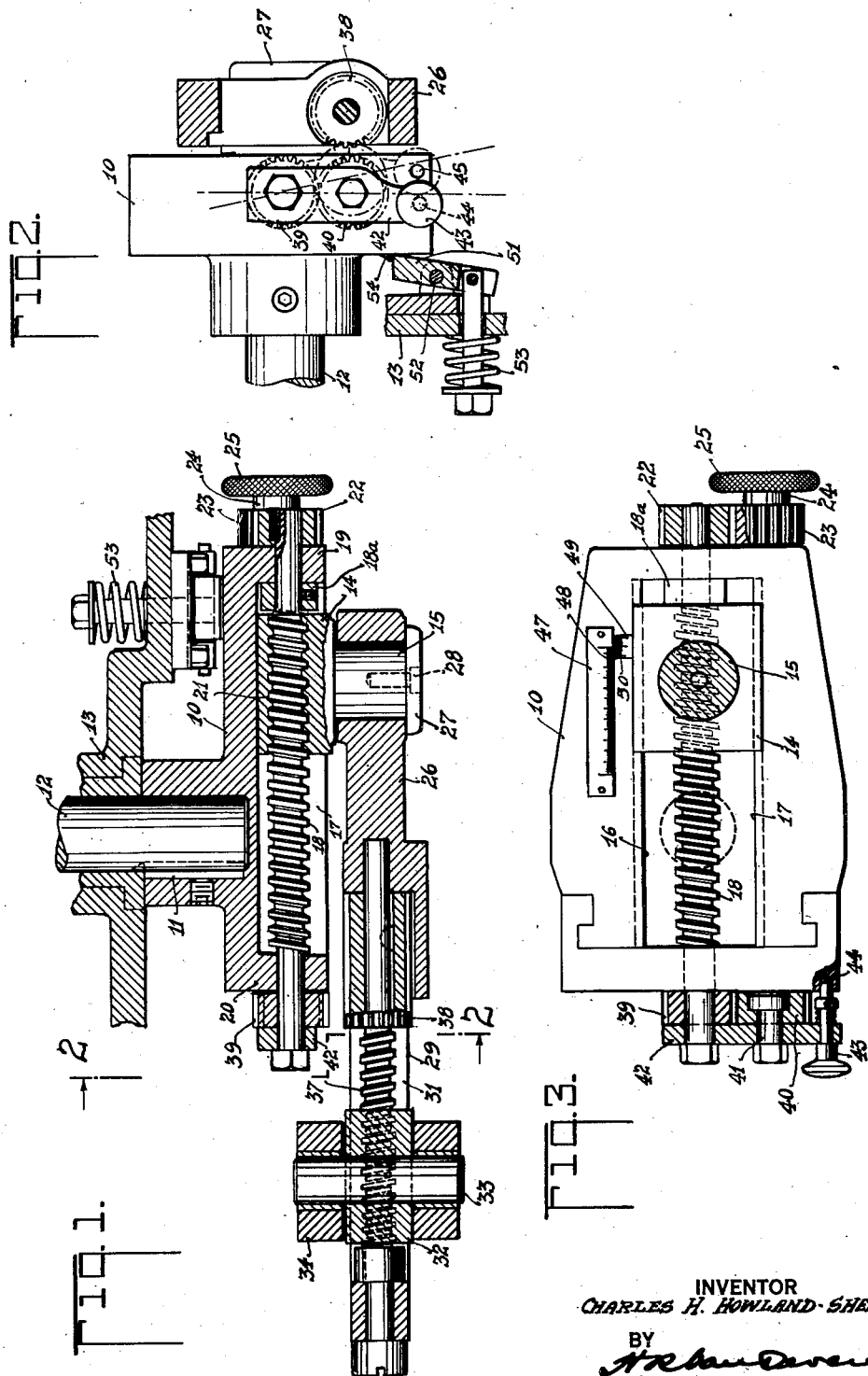
INVENTOR
CHARLES H. HOWLAND-SHEARMAN
BY
ATTORNEY

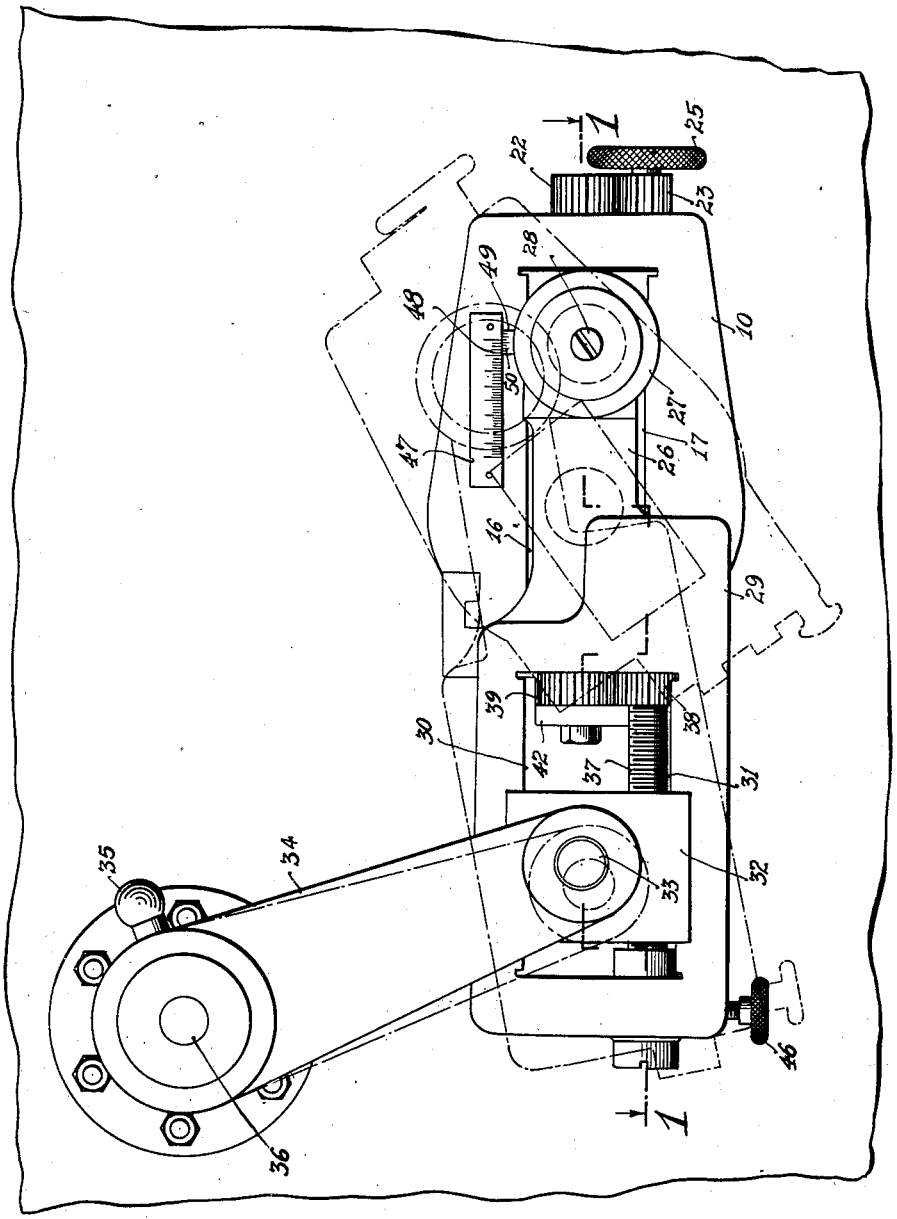

Patented May 5, 1936

2,039,848

UNITED STATES PATENT OFFICE 2,039,848

ADJUSTABLE MICROMETER CRANK

Charles H. Howland-Shearman, Hamden, Conn.

Application July 27, 1934, Serial No. 737,158

9 Claims. (Cl. 74—600)

This invention pertains to improvements in crank mechanisms. While it is particularly directed to structures for use on a machine tool such as the Kinetor or cold-flowing machine fully disclosed in copending application Serial No. 702,286, it is not limited thereto, as various other uses will be evident to those skilled in the art.

The purpose of the invention is to provide a crank having an adjustable throw.

A further purpose is to provide in combination with the above a compensating connecting rod having an adjustable length.

A still further object is to provide mutual means by which crank throw and connecting rod length may be cooperatively adjusted while maintaining a fixed position of the connected machine part which is to be actuated by the connecting rod.

Another object is to provide means by which the extent of such adjustment or its effect on the movement of a part connected to the mechanism may be read directly on a scale.

In accordance with the above and related objects, a preferred form of the device is hereinafter described in connection with the attached drawings, in which Figure 1 is a sectional view of the device in the plane 1—1, Figure 4.

Figure 2 is a cross section of the same in the plane 2—2, Figure 1.

Figure 3 is a side view of the crank partly in section.

Figure 4 is a side elevation of the mechanism attached to a machine part to be operated thereby.

Referring to Figure 1, a crank body 10 is secured by a key 11 to a rotative shaft 12 journalled in a supporting frame 13. A block 14 carrying a crank pin 15 is slidably retained in guide ways 16 and 17 provided in the crank body 10. A micrometer screw 18, rotatably mounted in the end portions 19 and 20 of the body 10 and axially restrained therein by means of a collar 18a, engages an internal therad 21 through the block 14.

A pinion 22 on the right or outer end of the screw 18 meshes with a second pinion 23 of smaller diameter on a stubshaft 24 journalled in the end portion 19 and carrying an adjusting head or handle 25. A connecting rod 26 rotatably engaging the crank pin 15 and axially retained thereon by a cap 27 secured by a screw 28, has an enlarged body portion 29 in which are formed guide ways 30 and 31. A block 32 is slidably guided in the ways 30 and 31 and carries a wrist pin 33 adapted to engage any machine element to which it is desired to transmit motion from the crank pin 15, the said element in this case being illustrated by an oscillating lever 34 secured by means of a shear pin 35 to a shaft 36.

A second screw 37 of the same lead as the screw 18 but of oppositely directed thread, is threaded through the block 32 and is rotatably retained in the ends of the enlarged body portion 29. The right end of the screw 37 has fastened thereon a long pinion 38. A pinion 39 of the same size and pitch as 38 is mounted on the micrometer screw 18.

A transfer pinion 40, permanently meshed with the pinion 39, is mounted on a pin 41 carried by a lever 42 swung on the end of the screw 18. A positioning lock or button latch 43 in the end of lever 42 is adapted to engage locating holes 44 and 45 in the crank body 10.

The operation of the device is as follows:

The lever 42 is normally positioned by the latch 43 so that the transfer pinion 40 clears the pinion 38. As the shaft 12 is revolved the parts function in the ordinary manner, the connecting rod 26 transmitting power from the crank pin 15 to the wrist pin 33 and thence to the lever 34 which is thereby oscillated and actuates the machine shaft 36 with an amplitude determined by the radial center distances of the crank pin 15 and the power shaft 12. When it is desired to change the throw of the crank, but at the same time, to retain the initial position of the actuated mechanism unaltered, the device is adjusted as follows:

The crank pin 15 is first brought to right hand dead center, as shown in Figure 4, corresponding to the initial position of the lever 34. In this position the long pinion 38 on the screw 37 is alined with the pinion 39 on the micrometer screw 18. The lever 42, Figure 2, is now swung to the right to bring the transfer pinion 40 into mesh with the long pinion 38, the latch 43 engaging the hole 45.

The adjusting head 25 is revolved manually, causing the micrometer screw 18 to move the block 14 inward or outward to decrease or increase the throw of the crank pin 15. The pin 15 in its movement carries with it the connecting rod 26. The pinions 38 and 39 being operatively connected by the transfer pinion 40, the manual revolution of the micrometer screw 18 produces a corresponding revolution of the screw 37 in the same direction. Therefore, as the block 14, crank pin 15 and connecting rod 26 are moved in one direction by the micrometer screw 18, the second screw 37, having an oppositely directed thread of equal pitch, moves the block 32 and wrist pin 33 an equal distance in the opposite direction relative to the connecting rod 26. The resultant of these two opposite motions is zero, the actual initial position of the wrist pin 33, lever 34 and connected parts remaining fixed.

The second screw 37 is now locked by means of a screw 46, Figure 4, and the transfer pinion 40 thrown out of mesh with the long pinion 38 by means of the lever 42, the latch 43 engaging the hole 44. The device is now in condition to again transmit motion to the lever 34 with the amplitude of motion altered by the resetting of the crank pin throw. The advantages of the device are obvious when it is considered that by its use it is possible to vary the stroke of any machine tool to which it may be applied without disturbing the initially set position of the working tool.

A visual scale 47, fastened to the crank body 10, has graduations 48 adapted to register with an indicating pointer 49 on the block 14. The scale 48 may be calibrated to indicate crank throw, or may be calibrated directly in terms of a motion produced thereby, such as the actual tool stroke of any machine to which the device is applied. The latter calibration allows the stroke adjustment to be read directly on the scale 47 as the adjusting handle 25 is manipulated. The pointer 49 may be graduated as a vernier 50 to allow very fine adjustment.

In order to assist alining the rod and crank at right hand dead center a pawl 51 pivoted at 52 and provided with a spring 53 may be secured to the frame 13. As the crank is slowly moved to right dead center in the counter-clockwise direction, the pawl 51 latches behind an extension 54 on crank body 10 as shown in Figure 2, thus definitely determining the dead center position when adjustments are to be made as previously described.

While the invention is shown in preferred form it is not limited to the precise structures shown, as various modifications may be made without departing from the scope of the appended claims.

What is claimed is:

1. In a crank mechanism adapted to actuate connected machine part, in combination, means to adjust the throw of said crank mechanism, and means connected to said machine part and adjustable by said adjusting means to compensate for the adjustment of said throw whereby said machine part may be maintained stationary during said adjustment.

2. In combination, a crank, a connecting rod cooperative therewith, means to adjust the throw of said crank, and means operable by said first means to vary the effective length of said rod.

3. In combination, a crank, a connecting rod cooperative therewith, means to adjust the throw of said crank, and means operable by said first means to vary the effective length of said rod by an amount equal to the amount of said adjustment.

4. In combination, a crank, a connecting rod cooperative therewith, screw means to adjust the throw of said crank, and screw means to adjust the effective length of said rod, said second screw means being operable by said first screw means.

5. In a crank mechanism adapted to actuate a connected machine part, in combination, means including a micrometer screw to adjust the throw of said crank mechanism, and means connected to said machine part and adjustable by said adjusting means to compensate for the adjustment of said throw whereby said machine part may be maintained stationary during said adjustment.

6. In combination, a crank body, a block radially slidable therein, a micrometer screw retained in said body and operable to slide said block, a crank pin on said block, a visual scale on said body adapted to be read in accordance with the position of said block, manual means to operate said screw, a connecting rod engaging said pin, a wrist pin movably retained in said rod, and a screw in said rod operable to position said wrist pin.

7. In combination, a crank body, a block radially slidable therein, a micrometer screw retained in said body and operable to slide said block, a crank pin on said block, manual means to operate said screw, a connecting rod engaging said crank pin, a wrist pin retained in said rod, a screw operable to position said wrist pin, and means to operatively connect said first and second screw.

8. In a crank mechanism adapted to impart motion to a machine part, in combination, means to vary the amplitude of said motion, means to indicate said amplitude, and means connected to said machine part and adjustable by said first means to compensate for the variation of said amplitude whereby one limit of said motion may be maintained fixed throughout said variation.

9. In combination, a stationary machine part, a shaft rotatably mounted therein, a crank on said shaft, a connecting rod cooperative therewith, means to adjust the throw of said crank, means operable by said first means to vary the effective length of said rod, and means including a latch on said stationary part and adapted to engage said crank to position said crank and said rod for adjustment.

CHARLES H. HOWLAND-SHEARMAN.